United States Patent
Williams et al.

(10) Patent No.: US 12,539,818 B2
(45) Date of Patent: Feb. 3, 2026

(54) COLLAPSIBLE TAILGATE-MOUNTED STORAGE CONTAINER

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US); Ryan C. Harris, Saline, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 70 days.

(21) Appl. No.: 18/679,731

(22) Filed: May 31, 2024

(65) Prior Publication Data
US 2025/0368146 A1    Dec. 4, 2025

(51) Int. Cl.
*B60R 9/06* (2006.01)
*B60R 11/06* (2006.01)
*B60R 11/00* (2006.01)

(52) U.S. Cl.
CPC ............... *B60R 9/065* (2013.01); *B60R 9/06* (2013.01); *B60R 2011/0082* (2013.01); *B60R 11/06* (2013.01)

(58) Field of Classification Search
CPC ........... B60R 9/06; B60R 9/065; B60R 11/06; B60R 2011/0082
See application file for complete search history.

(56) References Cited

U.S. PATENT DOCUMENTS

| | | | |
|---|---|---|---|
| 4,990,049 A | 2/1991 | Hargrove | |
| 5,154,470 A | 10/1992 | Bringman, Jr. | |
| 5,498,049 A | 3/1996 | Schlachter | |
| 6,199,930 B1 * | 3/2001 | Riley | B60R 11/06 224/404 |
| 6,254,162 B1 * | 7/2001 | Faber | B60R 5/04 224/539 |
| 6,412,847 B2 | 7/2002 | De Gaillard | |
| 6,557,918 B2 | 5/2003 | Iafrate et al. | |
| 6,811,067 B2 * | 11/2004 | Muizelaar | B62D 33/027 296/61 |
| 6,923,354 B2 | 8/2005 | Axelson | |
| 7,226,100 B1 | 6/2007 | Willey et al. | |
| 8,109,552 B2 | 2/2012 | Nelson | |
| 8,281,967 B2 | 10/2012 | Evans | |
| 8,776,778 B1 | 7/2014 | Brown | |
| 9,132,785 B2 * | 9/2015 | Roach | B60R 9/065 |

(Continued)

*Primary Examiner* — Justin M Larson
(74) *Attorney, Agent, or Firm* — Christopher G. Darrow; Darrow Mustafa PC

(57) ABSTRACT

Systems described herein relate to a stowable collapsible container for a truck bed. In one embodiment, a storage system includes a collapsible container having a footprint sized to fit within a tailgate of a truck. The collapsible container, in a collapsed state, is stowed in the tailgate with a lid of the collapsible container being flush with a bedside surface of the tailgate. In a deployed state, the lid aligns with a raised ledge in the truck bed. The storage system includes an attachment assembly. The attachment assembly mates with a tailgate attachment structure of the truck to secure the collapsible container to the tailgate when positioned thereon.

10 Claims, 8 Drawing Sheets

(56) References Cited

U.S. PATENT DOCUMENTS

| | | | |
|---|---|---|---|
| 9,308,947 B2 * | 4/2016 | Kmita | B60R 11/06 |
| D755,708 S * | 5/2016 | Roach | D12/414.1 |
| 9,387,812 B2 * | 7/2016 | Bexar | B60R 5/041 |
| 9,475,371 B2 | 10/2016 | LaBiche | |
| 9,481,316 B2 | 11/2016 | Faruque et al. | |
| 10,875,463 B2 * | 12/2020 | Pulleyblank | B60R 9/065 |
| 10,889,223 B2 * | 1/2021 | Pascarella | B62D 33/0273 |
| 11,117,507 B2 | 9/2021 | Teodorof et al. | |
| 11,130,451 B2 * | 9/2021 | Viniegra | B60R 11/06 |
| 11,358,534 B2 | 6/2022 | Gardner | |
| 2006/0214449 A1 * | 9/2006 | Klusmeier | B62D 33/0273 |
| | | | 296/26.11 |
| 2007/0262602 A1 | 11/2007 | Nagle | |
| 2008/0190977 A1 * | 8/2008 | Estabrook | B62D 33/0273 |
| | | | 224/535 |
| 2008/0231067 A1 | 9/2008 | Nagle | |
| 2009/0026197 A1 * | 1/2009 | Chou | A45C 7/0036 |
| | | | 220/9.2 |
| 2012/0325877 A1 * | 12/2012 | Franks | B60R 11/06 |
| | | | 224/404 |
| 2017/0136958 A1 | 5/2017 | Smith et al. | |
| 2020/0198545 A1 * | 6/2020 | Townson | B60R 7/02 |

* cited by examiner

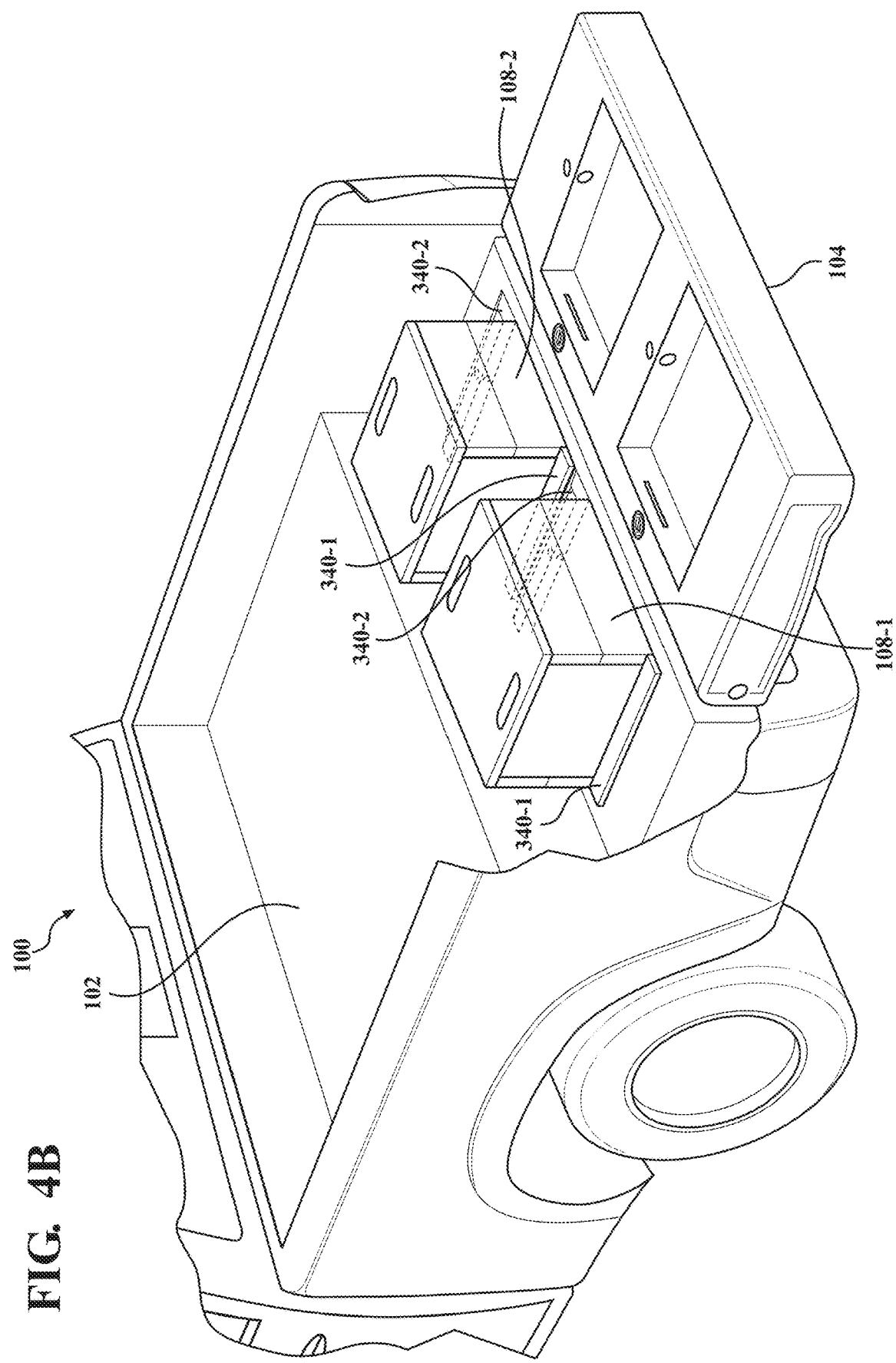

COLLAPSIBLE TAILGATE-MOUNTED STORAGE CONTAINER

TECHNICAL FIELD

The subject matter described herein relates, in general, to vehicle storage systems and, more particularly, to a collapsible tailgate-mounted storage container.

BACKGROUND

Some vehicles, referred to as trucks, include an open cargo space (i.e., a bed) behind the cab of the truck. Vertical side walls and a vertical front wall (i.e., adjacent to the truck cab) rise from the bed surface. A tailgate, which pivotally opens and closes, forms a fourth wall of the bed. When the tailgate is lowered, an individual can load cargo into the bed. The tailgate is then raised to prevent the cargo from sliding out of the bed during transit. This bed provides ample space for cargo that may otherwise be impossible or difficult to transport in a non-truck vehicle.

While trucks can be powered by an internal combustion engine, some trucks are powered at least partially by electric power. In addition to a 12 Volt (V) battery that powers various sub-systems of the truck, these plug-in hybrid electric vehicles (PHEV) and battery electric vehicles (BEV) include on-board batteries that store the electrical energy used by the propulsion system of the truck. These on-board batteries may be large, occupying valuable space on a vehicle, and may also be quite heavy.

SUMMARY

In one embodiment, example systems described herein improve truck bed storage, even when potentially negatively impacted by the presence of large and heavy on-board vehicle batteries.

In one embodiment, a vehicle storage system is disclosed. The storage system includes a collapsible container having a footprint sized to fit within a tailgate of a truck. In a collapsed state, the collapsible container is stowed in the tailgate with a lid of the collapsible container being flush with a bedside surface of the tailgate. In a deployed state, the lid aligns with a raised ledge in a bed of the truck. The storage system also includes an attachment assembly that mates with a tailgate attachment structure of the truck to secure the collapsible container to the tailgate when positioned thereon.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A-4B illustrates one embodiment of a multi-container storage system in a deployed state on a truck tailgate and in a truck bed.

DETAILED DESCRIPTION

Figure 1A:
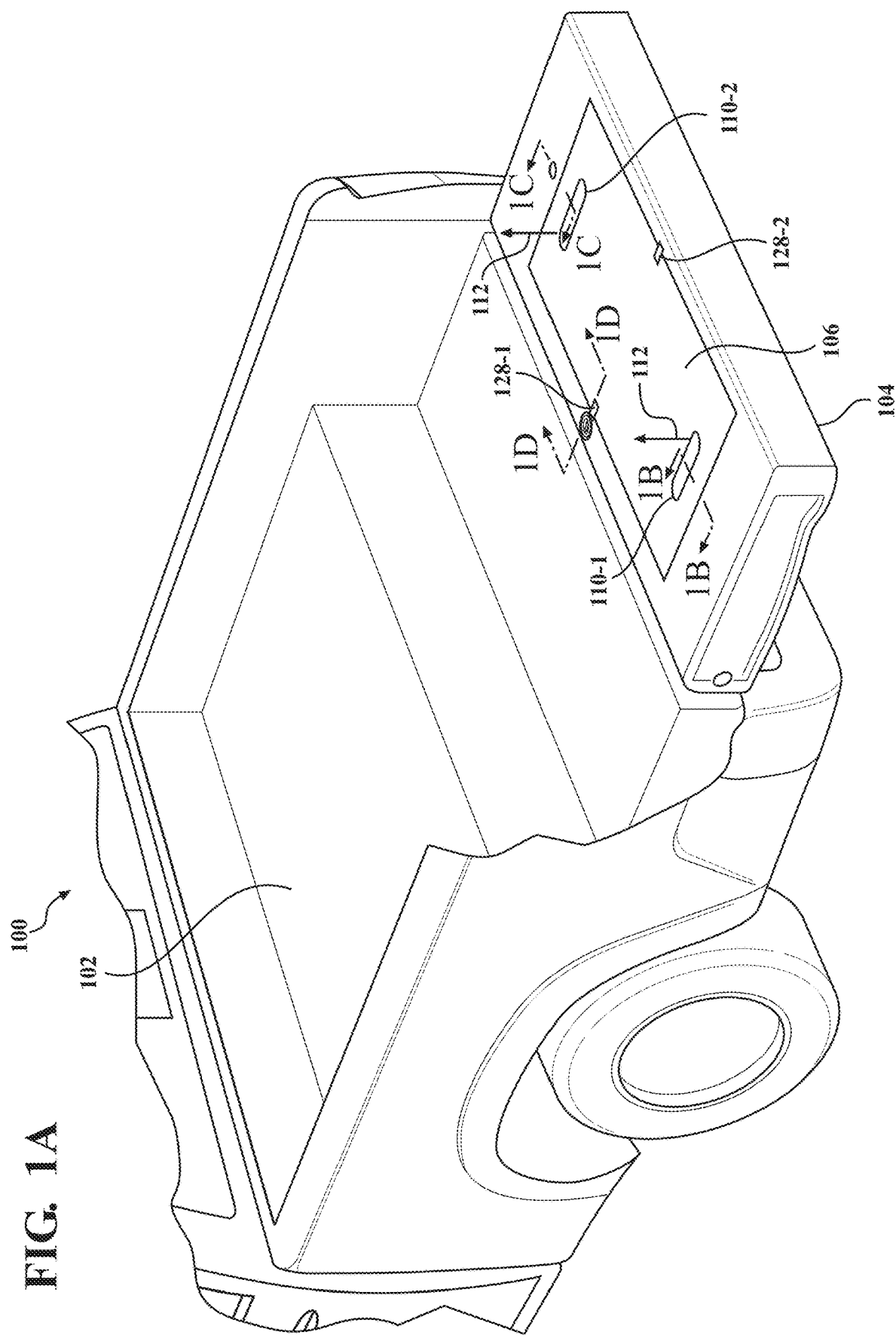
FIGS. 1A-1D illustrate one embodiment of a collapsible tailgate-mounted storage container in a collapsed state on a truck tailgate.

The systems described herein improve storage in an electrically powered truck. As previously described, some trucks are electrically powered by an on-board battery. In general, to produce sufficient electricity to power a truck, these on-board batteries may be large and heavy. In an attempt to reduce the positional adjustment of other truck components to accommodate the on-board battery, the on-board battery may be installed in the vehicle underneath the truck bed. A portion of the truck bed floor may be raised to accommodate the placement of the battery at this location. This results in a step or ledge in the truck bed with one portion of the floor (above the battery) at a higher elevation than the other portions of the floor. Such a stepped layout may reduce the effective cargo-carrying capacity of the truck bed and make it difficult or impossible to load/haul certain cargo. For example, it may be challenging to transport a dresser in the bed of a truck as one end of the dresser may be on the elevated ledge while another end of the dresser is on the lowered portion of the bed. This inclination destabilizes the dresser during transport. This example demonstrates how a stepped truck bed floor may negatively impact cargo hauling/storage. The reduced footprint may negatively impact other uses of the truck. For example, it may be more challenging to transport cargo longer than the truck bed (e.g., sheets of drywall and 2×4s) if the truck bed floor is not flat.

Accordingly, the present storage system provides an elongated flat surface on which to load/haul cargo over an otherwise stepped truck bed floor, which results from including an on-board vehicle battery beneath a portion of the truck bed. In addition to providing a larger flat loading/hauling surface, the storage system provides a container where objects may be stored. The system is selectively deployable such that when a longer and flat loading/hauling surface is not desired, the container collapses within the tailgate. The container is deployed or expanded when extra storage or a larger flat loading/hauling surface is desired.

Specifically, the storage system includes a collapsible tailgate-mounted container which may be stowed in the tailgate of the truck. When not in use, the container folds to a generally planar and flat shape, with the lid of the container being flush with the bedside surface of the tailgate. When a longer flat loading/hauling surface or enclosed storage is desired, the container is deployed, with the deployed height aligning with or matching the height of the battery-defined ledge in the truck floor. In an expanded state, an individual may load/haul large objects by placing them across the elevated ledge of the truck bed floor and the deployed container. That is, the collapsible container extends the flat surface area of the truck bed, which is otherwise reduced by placing the electric vehicle battery underneath the truck bed.

The collapsible container includes an attachment assembly that mates with an attachment structure of the tailgate to hold the collapsible container in place, whether collapsed or deployed. In a specific example of container-to-tailgate attachment, one side of the collapsible container is tucked under a flange of the tailgate. In this example, the opposite side of the collapsible container includes a recess that receives a locking ball of the tailgate attachment structure biased towards the collapsible container. When seated in the tailgate, the locking ball sits in the container recess and forces therebetween hold the collapsible container in place. Depression of a release plunger on the truck-based attachment structure disengages the locking ball from the container recess, such that the collapsible container may be removed from the tailgate to be placed at another location on the truck or used remotely. Additional details regarding the operation of the attachment assembly are provided below in connection with FIGS. 5A and 5B.

In an example, a second attachment structure (i.e., lip-engaging flange and locking ball) may be found within the truck bed. Accordingly, the collapsible container may be removed from the tailgate, placed in the truck bed, and attached to it. In this arrangement, rather than being spaced apart from the ledge, the collapsible container is adjacent to the ledge, thus providing a continuous flat surface, rather than a spaced apart flat surface as may be the case when the collapsible container is deployed on the tailgate. In either case, the attachment assembly ensures that the deployed or stowed collapsible container is not displaced from the truck.

As the attachment assembly facilitates the selective coupling of the collapsible container to the truck, the container may be removed from the truck entirely and moved to a remote location. For example, a tool-carrying container may be moved from the truck to a location closer to a job site where the tools may be needed.

In one example, the collapsible container includes an electrical outlet into which electrical components, such as construction tools, battery charging devices, etc., may be plugged. In this example, the collapsible container includes an electrical contact that mates with an electrical contact of the truck's electrical system. As a specific example, the collapsible container may include outwardly facing electrical contacts that, when the collapsible container is seated into either the tailgate or truck bed, contact the truck's electrical contacts to establish an electrical connection. Via this electrical connection, power from the vehicle battery is provided to the electrical outlet to power any number of electrical devices.

In this way, the disclosed storage system allows the customer to recover a full flat truck bed for loading and hauling large and/or oversized cargo, even when a vehicle-mounted battery may result in a ledge on the truck bed floor. Moreover, the collapsible container can be placed at different distances away from the ledge (i.e., either immediately adjacent to the ledge or spaced apart from the ledge on the tailgate), thus providing different lengths of flat surfaces on which cargo may be placed.

Figure 1B:
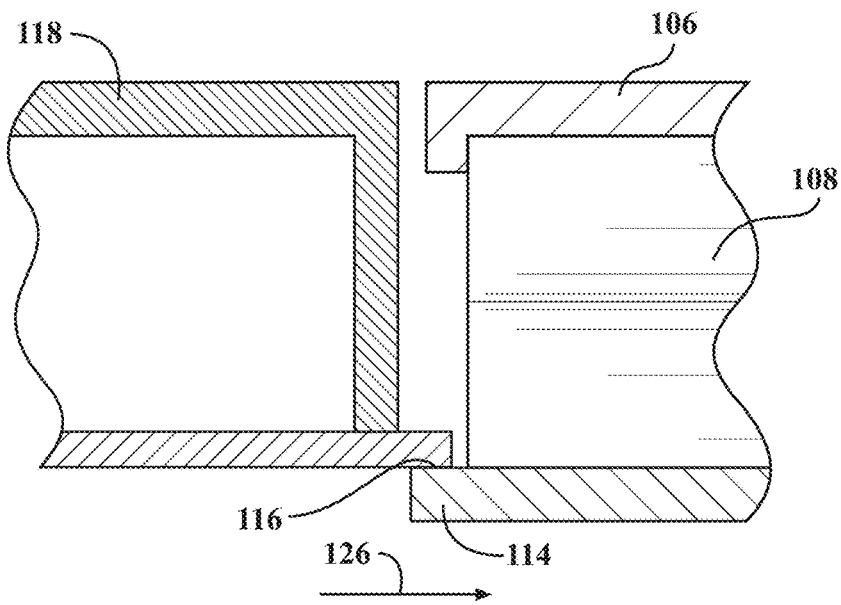
Figure 1C:
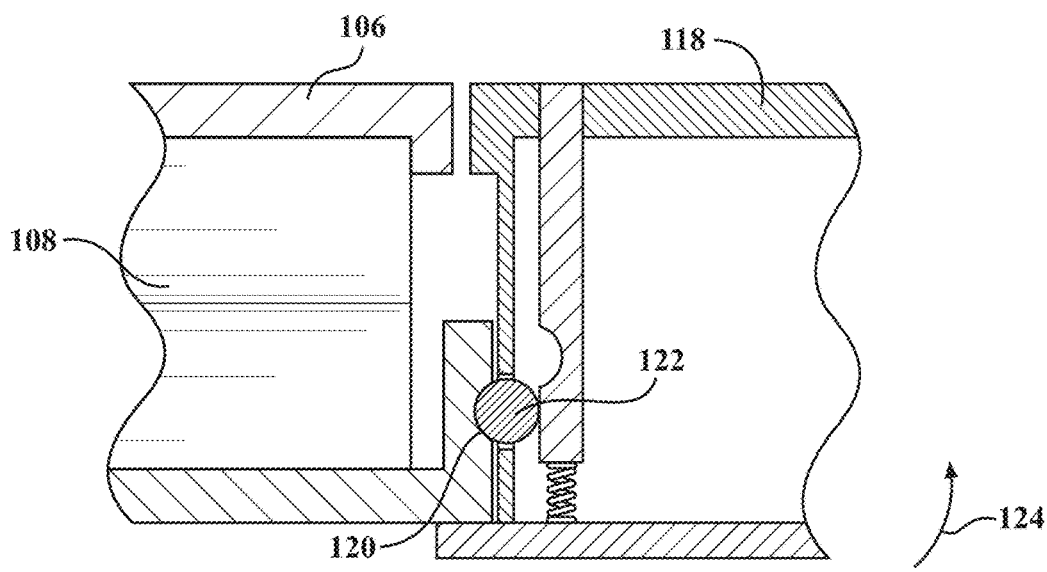
Figure 1D:
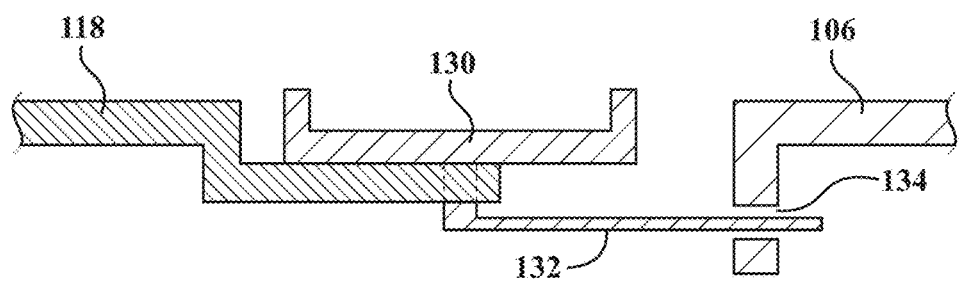

Turning now to the figures, FIGS. 1A-1D illustrate one embodiment of a tailgate-mounted collapsible container 108 in a collapsed state on a truck tailgate 104. FIG. 1B is a cross-sectional view taken along the line 1B in FIG. 1A. FIG. 1C is a cross-sectional view taken along the line 1C in FIG. 1A. FIG. 1D is a cross-sectional view taken along the line 1D in FIG. 1A. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

As described above, trucks are vehicles with a bed 100 that can hold and haul large cargo and/or large quantities of cargo. In general, the bed 100 includes a flat floor with side walls and a front wall extending vertically therefrom. A tailgate 104 of the truck may be pivotally attached to transition between a closed or raised position and an opened or lowered position. FIGS. 1A-1D depicts the tailgate 104 in a lowered position. During hauling, the tailgate 104 is raised to form a fourth wall of the bed 100. With the tailgate 104 raised, the cargo, which may be secured with ropes, straps, tie-downs, or covers, may be easily transported. As used in the present specification and in the appended claims, the bedside surface 118 of the tailgate 104 refers to the exterior surface of the tailgate 104 that faces the bed 100 when in the raised position. When lowered, the bedside surface 118 of the tailgate 104 is horizontal and aligned with a lowered portion of the truck bed 100 floor.

Also as described above, some trucks are electrically powered by an on-board vehicle battery. The battery may be stored underneath the truck bed 100 floor. A portion of the truck bed 100 floor above the battery may be raised to facilitate the placement of the battery underneath the truck bed 100. As described above, this may result in a ledge 102 or a raised portion of the truck bed 100 floor. This ledge 102 reduces the effective flat surface area of the truck bed 100. To provide a flush surface notwithstanding this ledge 102, the storage system of the present specification includes a collapsible container 108 that is deployable and, as described below, can provide an extended flat surface in a truck bed 100 with a ledge 102.

As depicted in FIG. 1A, the collapsible container 108 has a footprint sized to fit within the tailgate 104 of the truck, where it is stored when unused. The collapsible container 108 is stowed in the tailgate 104 with a lid 106 of the collapsible container 108 flush with the bedside surface 118 of the tailgate 104. As depicted in FIGS. 1C and 3D, the tailgate 104 may include a recess into which the collapsible container 108 sits. That is, the collapsible container 108, even in the collapsed state, has a height, and the depth of the recess in the tailgate 104 may be approximately the same as the height of the collapsible container 108. Accordingly, when the collapsible container 108 is collapsed and seated in the recess of the tailgate 104, the lid 106 is flush with the bedside surface 118 of the tailgate 104 over which cargo is stored/loaded to not block or impede user interaction with the truck (e.g., loading and/or hauling of cargo).

Figure 2:
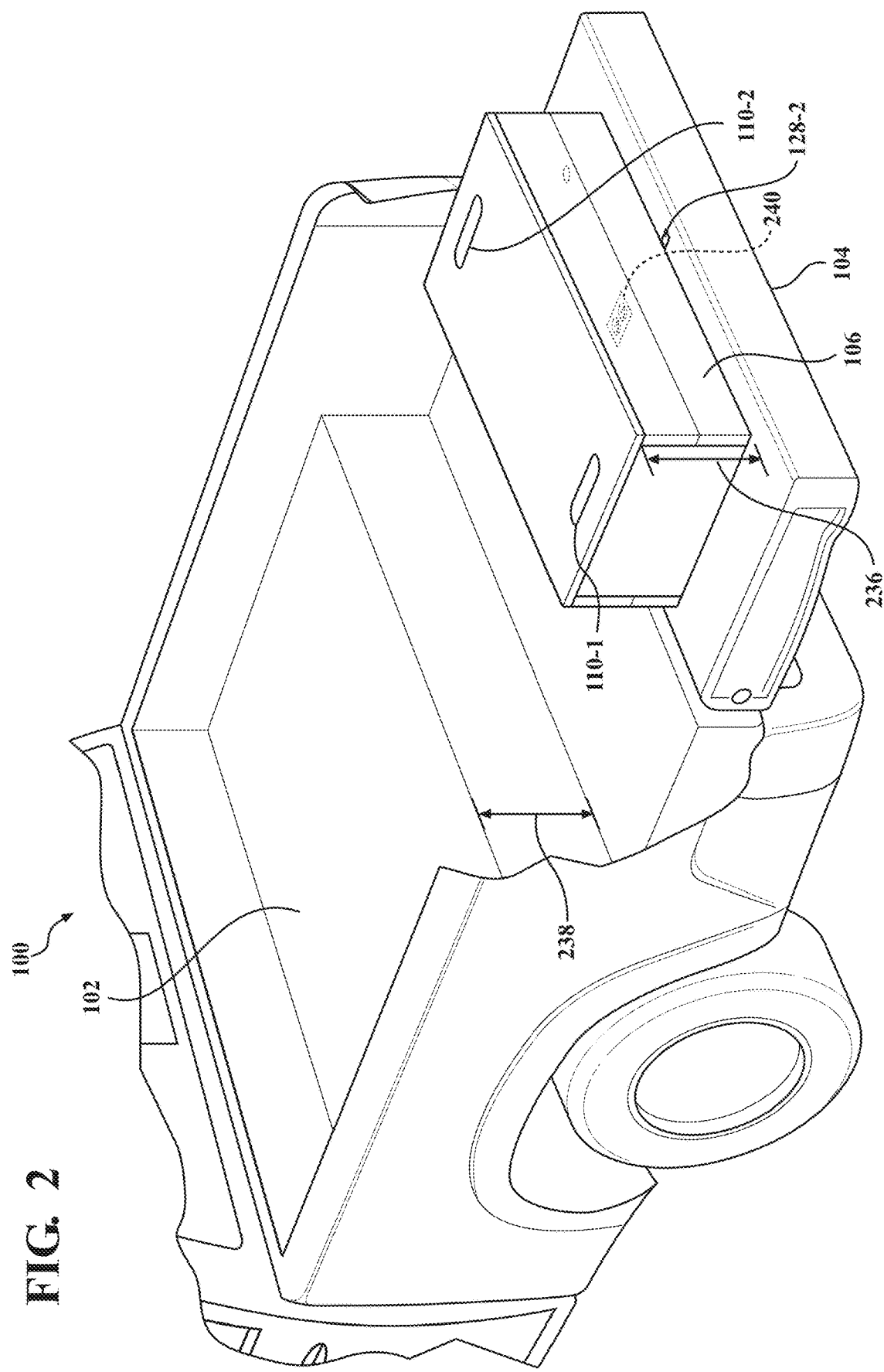
FIG. 2 illustrates one embodiment of a collapsible tailgate-mounted storage container in a deployed state on a truck tailgate.

As described above and as depicted in FIG. 2 below, the collapsible container 108 may be expanded. Specifically, the collapsible container 108 may be extended vertically upward to define a volume wherein cargo may be stored. In an example, the extended height of the collapsible container 108 aligns with and/or matches the height of the ledge 102. To facilitate the upward extension, the collapsible container 108 may include handles 110-1 and 110-2 on the lid 106 to facilitate raising the collapsible container 108 from the collapsed state as depicted in FIG. 1A to the deployed state, as depicted in FIG. 2. Specifically, a user may grasp the handles 110-1 and 110-2 and pull upward in a direction indicated by the arrows 112. In one example, pulling vertically on the handles 110-1 and 110-2 may form the expanded container. In an example, the handles 110-1 and 110-2 may be integrated (e.g., molded) into the lid 106 of the collapsible container 108. In other examples, the handles 110-1 and 110-2 may be otherwise attached (e.g., press fit, screwed, bolted, etc.) to the collapsible container 108.

The collapsible container 108 may expand because the base of the collapsible container 108 is rigidly held in place via the tailgate attachment structure, as depicted in FIGS. 1B and 1C described below. In other examples, a user may otherwise raise the sidewalls of the collapsible container 108 to form the cargo-containing volume.

The storage system includes an attachment assembly to retain the collapsible container 108 in place during storage or use. Specifically, the attachment assembly may be integrated with the collapsible container 108 and may mate with a tailgate attachment structure of the truck to secure the collapsible container 108 to the tailgate 104 when positioned thereon. The attachment assembly may take various forms, one of which is described herein as an example and depicted in FIGS. 1B and 1C.

That is, FIG. 1B, which is a cross-sectional view of the attachment assembly and tailgate attachment structure taken along the line 1B in FIG. 1A, depicts a component of the attachment assembly. As depicted in FIG. 1B, the attachment assembly includes a flange 114 on the bottom edge of a first surface of the collapsible container 108. The flange 114 interfaces with a lip 116 on a truck-based attachment structure. Specifically, the lip 116 extends from an inner panel of the tailgate 104. The lip 116/flange 114 interference prevents movement of the collapsible container 108 in the vertical direction. Based on the tightness of the interface, the lip 116/flange 114 interference may also prevent movement in at least one direction of a horizontal plane.

FIG. 1C, which is a cross-sectional view of the attachment assembly and the tailgate attachment structure taken along the line 1C in FIG. 1C, depicts another component of the attachment assembly. Specifically, as depicted in FIG. 1C, the bottom edge of a second surface of the collapsible container 108, which is opposite the first surface, includes a concave recess 120 that interfaces with a locking ball 122 to secure the collapsible container 108 in place. While FIG. 1 depicts these attachment assembly components on lateral side surfaces of the collapsible container 108 (i.e., container surfaces that are parallel with the side surfaces of the truck), these components may similarly be positioned on other opposite side surfaces of the collapsible container 108 (i.e., a front and back surface of the collapsible container 108 with "front" designating a surface the front of the truck closest and the "back" surface being the surface farthest from the front of the truck).

Figure 5A:
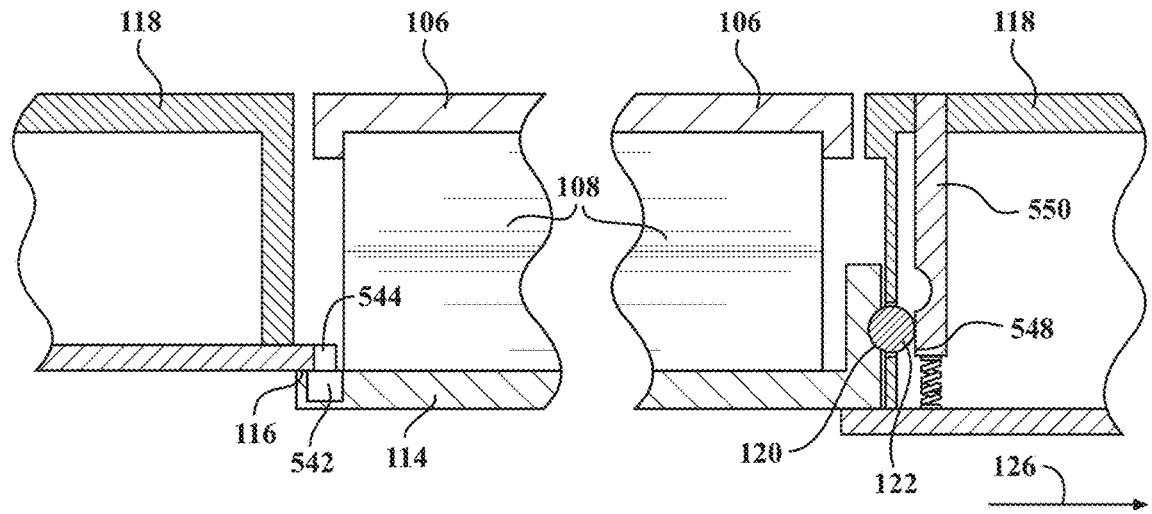
FIGS. 5A and 5B depict a cross-sectional view of the engagement/disengagement of the attachment assembly.
Figure 5B:
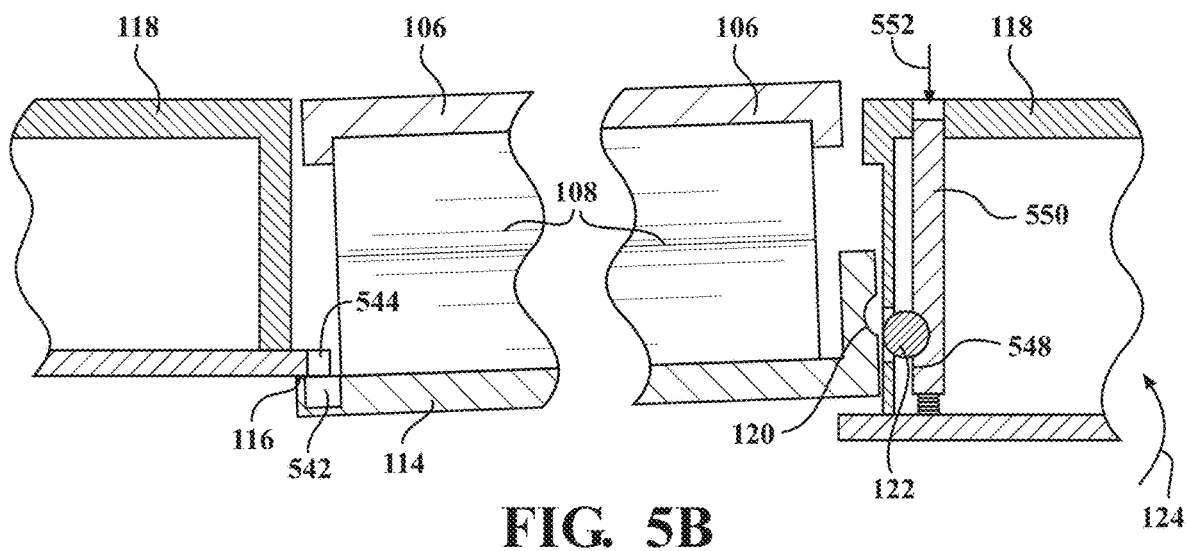

To remove the collapsible container 108, a user disengages the locking ball 122 from the concave recess 120 as described more fully in connection with FIGS. 5A and 5B, and rotates the collapsible container 108 in a direction indicated by the arrow 124 in FIG. 1C, such that the collapsible container 108 may be slid horizontally, as indicated by the arrow 126 in FIG. 1B to disengage the flange 114 from the lip 116. The collapsible container 108 may then be fully unseated and removed from the recess in the tailgate 104. A user may install the collapsible container 108 into the recess by executing the process described above in reverse order.

As such, the collapsible container 108 is removably attached to the tailgate 104 via the attachment assembly. Upon disengagement of the attachment assembly of the collapsible container 108 from the tailgate attachment structure, the collapsible container 108 may be transported away from the truck. For example, the collapsible container 108 could hold different cargo, such as food for a picnic or construction tools. In either of these cases, the collapsible container 108 may be removed from the tailgate 104 and carried closer to the picnic, job site, etc.

In an example, the tailgate attachment structure further includes a latch structure 128-1 and 128-2 to maintain the collapsible container 108 in a collapsed state. That is, were there no such structure, when the tailgate 104 is in a vertical position, or when driving on roads at high velocities/wind speeds, the aerodynamic forces and/or gravity may cause the collapsible container 108 in the collapsed state, to at least partially expand, which could pose a hazard to other road users. FIG. 1D depicts a cross-sectional view of a latch structure 128-1 taken along the line 1D in FIG. 1A. As depicted, the latch structure includes a dial 130 that is rotationally coupled to the bedside surface 118 of the tailgate 104. A base of the blade 132 extends town from the dial 130 and through an aperture in the bedside surface 118 of the tailgate 104. An arm of the blade 132 extends perpendicular to the base and through an aperture 134 in the lid 106. The interaction of the blade 132 and the aperture 134 ensures the collapsed container 108 remains in a collapsed and stored state, notwithstanding gravitational, aerodynamic, or other forces. The dial 130 may be rotated, for example, 90 degrees, to remove the blade 132 from the aperture 134, such that the collapsible container 108 may be raised as described above.

FIG. 2 illustrates one embodiment of the collapsible tailgate-mounted storage container 108 in a deployed state on a truck tailgate 104. As described above, the collapsible container 108 may be expanded to a deployed form with greater height 236. In an example, in the deployed state, the lid 106 of the collapsible container 108 aligns with the raised ledge 102 in the bed 100 of the truck. For example, the ledge 102 may have a height 238 of between 250 and 300 millimeters (mm) based on the type of vehicle, type of battery, etc. In this example, the collapsible container 108 may expand to a height 236 of between 250-300 mm to match the height 236 of the ledge 102. While particular reference is made to a particular height 236 of the ledge 102 and a particular height 238 of the collapsible container 108, the ledge 102 and container 108 may have different heights based on different uses such as different types of batteries, different types of vehicle, etc. When the collapsible container 108 is deployed, a user may be able to load and haul large cargo stably. Were cargo placed on an uneven surface such as that generated by the ledge 102, the cargo would be unstable and pose a risk of falling from the truck bed 100.

The expandability of the collapsible container 108 may be provided in various ways. As one example, the sidewalls of the collapsible container 108 may be attached via a hinge to the base of the collapsible container 108 and unattached to adjacent sidewalls and the lid 106 of the collapsible container. Accordingly, the side panels may fold down on top of one another when the collapsible container 108 is in the collapsed state. To expand the collapsible container 108, the sidewalls may be raised and joined to one another (e.g., via latches, snaps, hooks, magnets, or some other mechanism) to form the sturdy cargo-containing volume with the lid 106 placed thereon to form a closed volume.

As another example, each sidewall of the collapsible container 108 may be formed of various rigid panels that are hingedly coupled together. For example, a sidewall may include an upper clamshell panel and a lower clamshell panel joined together by a horizontal hinge. The upper clamshell panel may be hingedly attached to the lid 106 of the collapsible container 108, and the lower clamshell panel may be hingedly attached to the base of the collapsible container 108. When collapsed, the clamshell panels are stacked on top of one another. When subject to a vertical force such as a user pulling up on the handles 110 (i.e., as indicated by the arrows 112 in FIG. 1A), the clamshell panels "open" and lock in place (e.g., for example, via latches, snaps, hooks, magnets, or the like) to place the collapsible container 108 in the deployed state. To return the collapsible container 108 to the collapsed state, a user may disengage the lock (for example, by pressing on the hinge in an inward direction) and push down on the lid 106.

In yet another example, one set of opposite sidewalls (i.e., the longer sidewalls) may be formed of the aforementioned clamshell panels that are hingedly attached, the upper clamshell panel being hingedly attached to the lid 106 of the collapsible container 108 and the lower clamshell panel being hingedly attached to the base of the collapsible container 108. The other set of sidewalls (i.e., the shorter sidewalls) may be single-piece rigid sidewalls (i.e., not clamshell panels) hingedly attached to the lid 106 of the collapsible container 108. In this example, upon lifting the handles 110, as indicated in FIG. 1A, the shorter sidewalls extend down, and the hinged clamshell longer sidewalls unfold. Attachment devices around the periphery of each sidewall (e.g., latches, magnets, snaps, hooks, or the like) may connect to form the cargo-containing volume. For example, the periphery of each sidewall may include a magnet that interfaces with magnets on an adjacent sidewall to hold such together to form the cargo-containing volume. While particular reference is made to a particular collapse/deployment modalities, the collapsible container 108 may be any container that can be expanded from a generally flat planar state to an expanded positive volume state.

In an example, the storage system includes an electrical outlet 240 disposed within the collapsible container 108. That is, it may be the case that some cargo items are electrically powered. Examples include electrical tools, battery charging devices, coolers, etc. In this way, the collapsible container 108 may provide power to these and other devices. While FIG. 2 depicts the electrical outlet 240 disposed on the interior of the collapsible container 108, in another example, the electrical outlet 240 may be disposed on the exterior of the collapsible container 108. As depicted below in FIGS. 5A and 5B, in an example, the collapsible container 108 may include electrical contacts that, when the collapsible container 108 is mated to the tailgate 104 and/or truck bed 100, interface with electrical contacts in the tailgate 104 and/or truck bed 100 that are connected to the battery of the truck. As such, an electrical path is established from a power source (e.g., the vehicle's battery) to the electrical outlet 240 to supply power to any plugged-in electrical device.

Figure 3A:
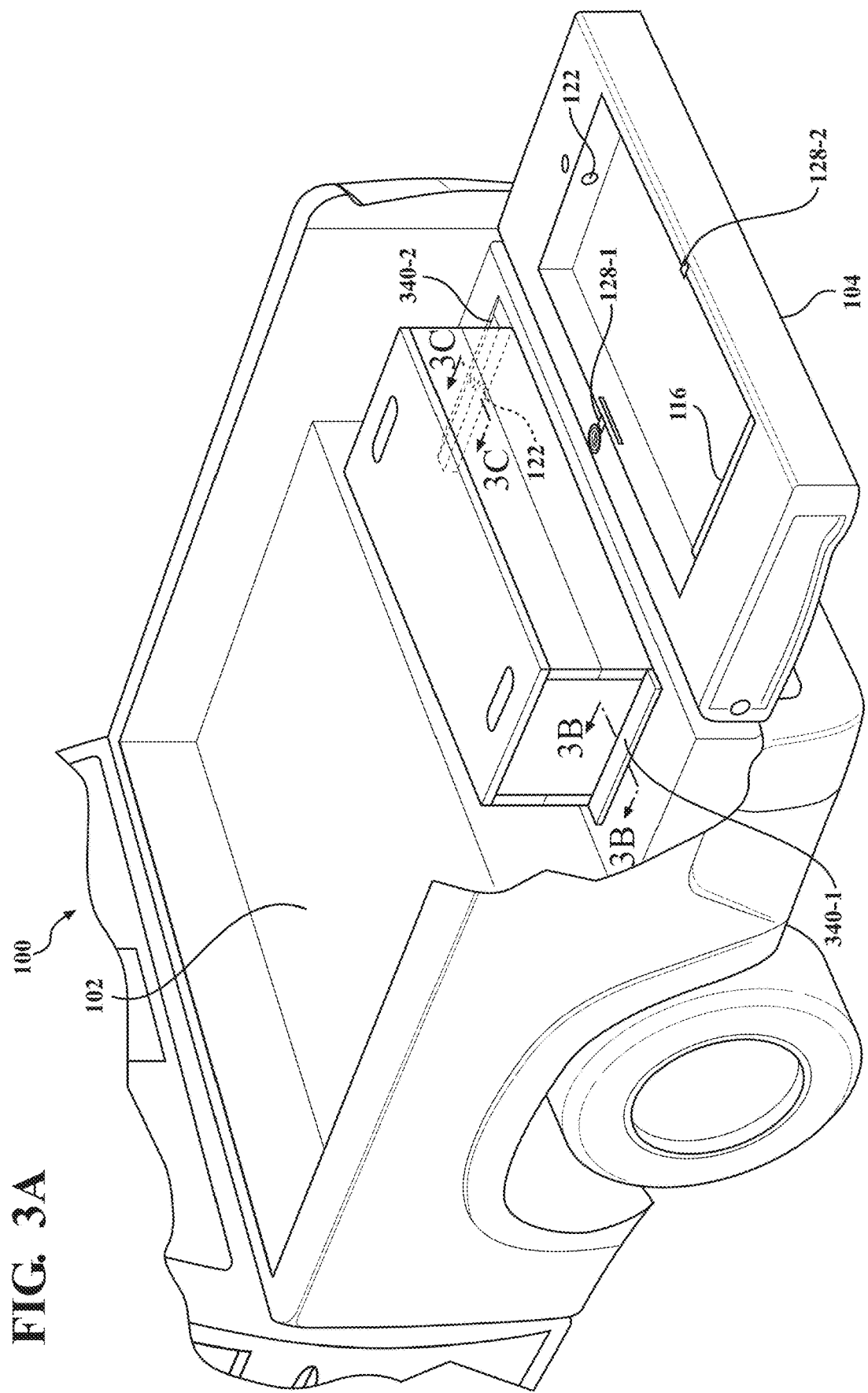
FIGS. 3A-3C illustrates one embodiment of a collapsible tailgate-mounted storage container in a deployed state in a truck bed.
Figure 3B:
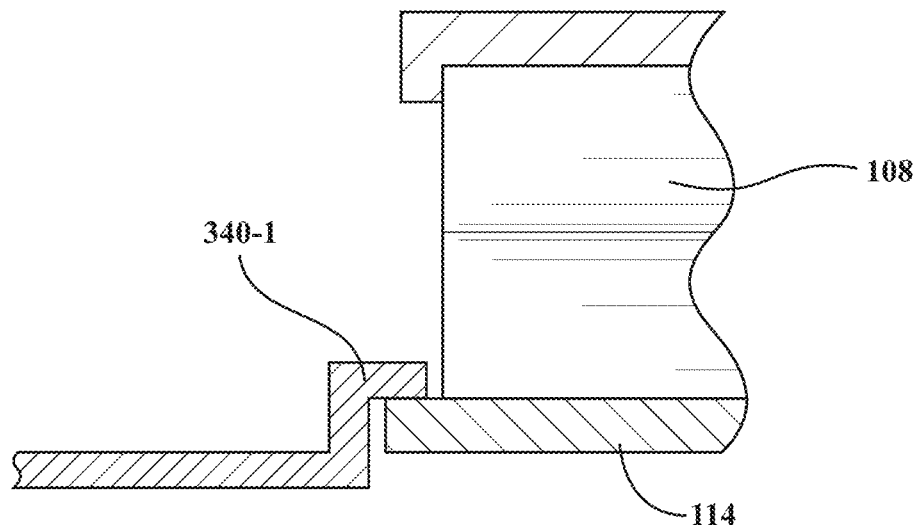
Figure 3C:
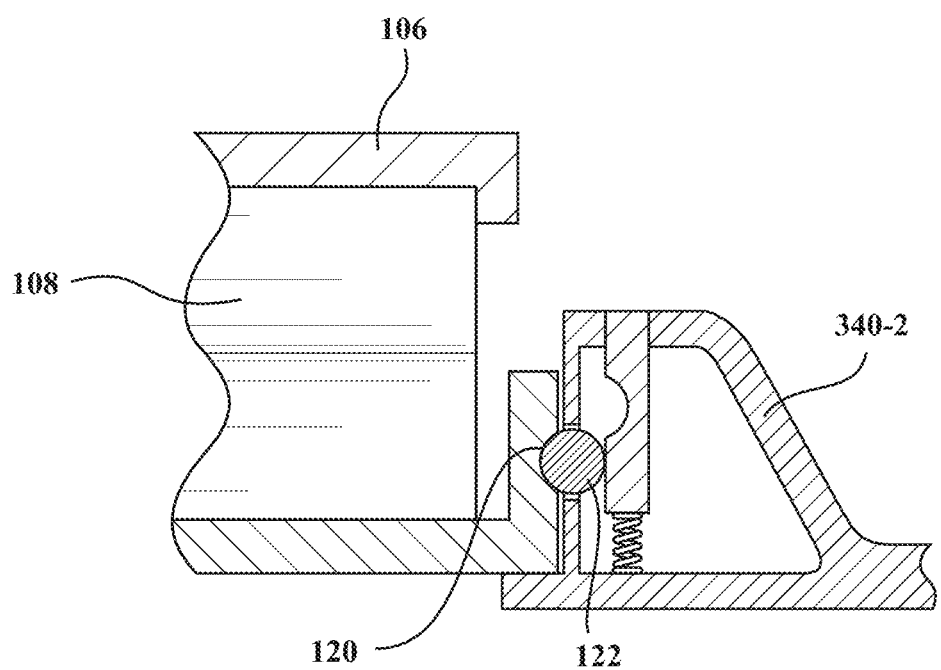

FIGS. 3A-3C illustrate one embodiment of a collapsible tailgate-mounted storage container 108 in a deployed state on a truck bed 100. FIG. 3B is a cross-sectional view taken along the line 3B from FIG. 3A. FIG. 3C is a cross-sectional view taken along the line 3C from FIG. 3A. As depicted in FIG. 2, when deployed on the tailgate 104, there is a space between the deployed container 108 and the ledge 102. This may be acceptable in certain circumstances. However, in other circumstances, having a continuously flat surface may be desirable rather than a gapped flat surface. Accordingly, in an example, the collapsible container 108 is mountable in the truck bed 100 directly adjacent to the ledge 102 to provide a continuously flat, albeit shorter, loading/hauling surface. That is, the collapsible container 108 may be removed from the tailgate 104 and placed in the truck bed 100.

In this example, the attachment assembly of the collapsible container 108 mates with a truck bed attachment structure of the truck to secure the collapsible container 108 to the bed 100 when positioned thereon. That is, the truck bed attachment structure may be similar to the tailgate attachment structure described above. Specifically, the truck bed attachment structure may include rails 340-1 and 340-2 in the truck bed on either side of the location where the collapsible container 108 is to be positioned. One rail 340-1 may include the lip 116 that interfaces with the flange 114 of the collapsible container 108, and the other rail 340-2 may include the locking ball 122 that interfaces with the concave recess 120 of the collapsible container 108. In another example, the truck bed 100 includes a recess into which the collapsible container 108 sits. In this example, the truck bed attachment structure components may be seated in the recess, as depicted in FIGS. 1B and 1C.

Thus, the collapsible container 108 extends the flat surface of the truck bed 100 by different amounts based on a desired application. For example, when a continuous flat surface is desired, and a shorter flat bed length is acceptable, the collapsible container 108 may be installed in the truck bed 100 adjacent the ledge 102 as depicted in FIG. 3. By comparison, when a longer flat bed length is desired, and a gap in the flat loading/hauling surface is acceptable, the collapsible container 108 may be installed in the tailgate 104 as depicted in FIG. 2. In either case, the storage system of the present specification provides a flat loading surface in a truck bed 100 that otherwise may not have such.

Figure 4A:
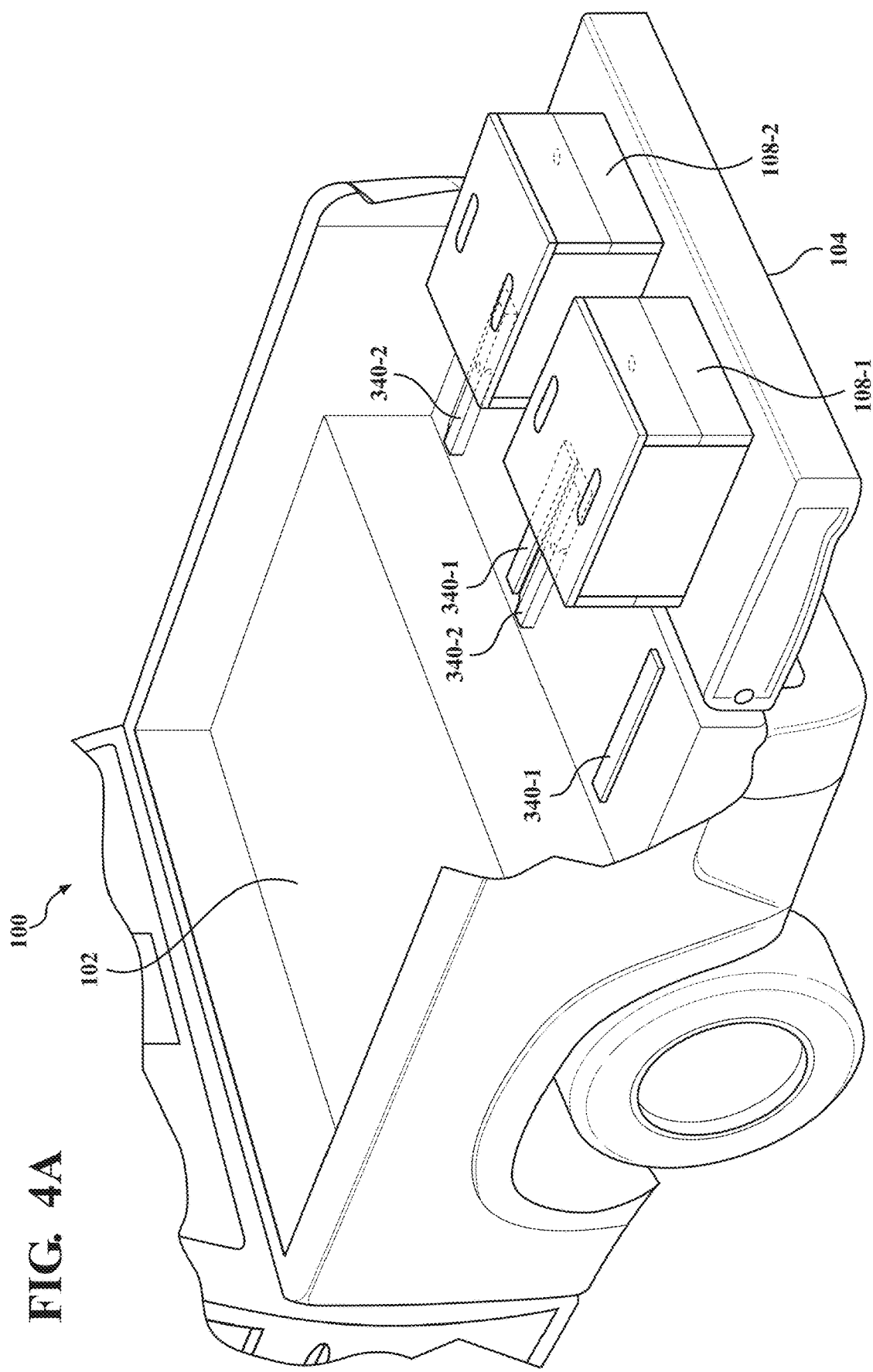

FIGS. 4A and 4B illustrate one embodiment of a multi-container storage system in a deployed state on a truck tailgate 104. That is, in the example depicted in FIGS. 4A and 4B, rather than a single full-width collapsible container 108, as depicted in FIGS. 1-3, the storage system may include multiple collapsible containers 108-1 and 108-2. That is, the system includes a second collapsible container 108-2 that includes similar structural features as the previously described collapsible container (i.e., collapsible sidewalls, attachment assembly, handles 110, etc). In this example, the second collapsible container attachment assembly mates with a second tailgate attachment structure to secure the second collapsible container 108-2 to the tailgate 104 when positioned thereon. That is, the tailgate 104 may have multiple sets of attachment structures, one for each collapsible container 108-1 and 108-2. Each set may have the components described above (i.e., lip 116 and locking ball 122) to secure a corresponding collapsible container 108 to the tailgate 104. Specifically, a flange 114 of the first collapsible container 108-1 rests under a first lip 116, while a concave recess 120 of the first collapsible container 108-1 engages a first locking ball 122. Similarly, a flange 114 of the second collapsible container 108-2 rests under a second lip 116, while a concave recess 120 of the second collapsible container 108-2 engages a second locking ball 122.

In this example, each collapsible container 108-1 and 108-2 may sit within an individual recess in the tailgate 104. When seated in a recess, the respective collapsible container 108-1 and 108-2 is prevented from translating in a horizontal plane. The respective collapsible container attachment assemblies mating with the tailgate attachment structure prevent movement in the vertical plane.

In one example, there may be a gap between the collapsible containers 108-1 and 108-2. That is, the tailgate 104 may include a rib between the recesses that receive respective collapsible containers 108-1 and 108-2. On this rib, the respective tailgate attachment structure components are mounted to retain the collapsible containers 108-1 and 108-2 in place during storage and use when loading/hauling. For example, a first locking ball 122 for the first collapsible container 108-1 and a second lip 116 for the second collapsible container may be positioned on the rib between the locations where the collapsible containers 108-1 and 108-2 are to be seated.

In another example, the collapsible container attachment assembly components and the tailgate attachment structure components may be on the front and back rather than lateral surfaces. In this example, the collapsible containers 108 may be directly adjacent to one another, with multiple sets of tailgate attachment structure components formed on the front and back of the tailgate recess, with the front surface being defined as the surface closest to the front of the truck.

As described above in connection with FIG. 3, in this multi-container storage system, each collapsible container 108-1 and 108-2 may similarly be positioned in the truck bed as depicted in FIG. 4B. That is, the second collapsible container 108-2, in addition to the first collapsible container 108-1, may mate with a second truck bed attachment structure of the truck to secure the second collapsible container 108-2 to the bed 100 when positioned thereon. Specifically, the second collapsible container attachment assembly mates with a second truck bed attachment structure to secure the second collapsible container 108-2 to the truck bed 100 floor when positioned thereon. That is, the truck bed 100 floor may have multiple sets of attachment structures, one for each collapsible container 108-1 and 108-2. Each set may have the components described above (i.e., lip 116 and locking ball 122) to secure a corresponding collapsible container 108 to the truck bed 100 floor. Specifically, a flange 114 of the first collapsible container 108-1 rests under a first lip 116, while a concave recess 120 of the first collapsible container 108-1 engages a first locking ball 122. Similarly, a flange 114 of the second collapsible container 108-2 rests under a second lip 116, while a concave recess 120 of the second collapsible container 108-2 engages a second locking ball 122.

As described above, in one example, there may be a gap between the collapsible containers 108-1 and 108-2. In this example, corresponding truck bed attachment structure components may be positioned between regions of the truck bed 100 floor where collapsible containers 108-1 and 108-2 are to be positioned. For example, a first locking ball 122 for the first collapsible container 108-1 and a second lip 116 for the second collapsible container 108-2 may be positioned on the truck bed 100 floor between the locations where the collapsible containers 108-1 and 108-2 are to be seated.

In another example, the collapsible container attachment assembly components and the tailgate attachment structure components may be on the front and back rather than lateral surfaces. In this example, the collapsible containers 108 may be directly adjacent to one another with multiple sets of truck bed attachment structure components placed on the truck bed 100 floor in front of and behind the locations where the collapsible containers 108-1 and 108-2 are to be placed, with the front surface being defined as that surface closest to the front of the truck.

FIGS. 5A and 5B depict a cross-sectional view of the engagement/disengagement of the attachment assembly with a truck-based attachment structure. As described above, the attachment assembly retains the collapsible container 108 during loading and/or hauling. Were the container 108 not retained in place, damage to the cargo, damage to the truck bed, or injury to any number of road users may result. As described above, the attachment assembly may take a variety of forms, one of which is described herein with a flange 114 and a concave recess 120 of the collapsible container 108 interact with a lip 116 and a locking ball 122 of a truck-based attachment structure (i.e., the tailgate attachment structure and the truck bed attachment structure).

When attached to the tailgate 104 or truck bed 100, the flange 114 of the collapsible container 108 is positioned under a lip 116 of the tailgate or truck bed attachment structure. This prevents the vertical movement of the collapsible container 108. The tightness of the fit may also prevent some movement in one direction of a horizontal plane and movement in a second direction of the horizontal plane.

As depicted in FIG. 5A, an opposite side of the collapsible container 108, includes a further component of the attachment structure, specifically, a concave recess 120 that receives a locking ball 122 of the truck-based attachment structure. As depicted in FIGS. 5A and 5B, the locking ball 122 is supported within the truck-based attachment structure to allow the locking ball 122 translation in a horizontal direction 126. When mounted to the tailgate 104 or truck bed 100, as depicted in FIG. 5A, the locking ball 122 is seated in the concave recess 120 and prevented from horizontally moving in the first direction by a straight surface 548 of a plunger 550. That is, the locking ball 122 is wedged between the straight surface 548 of the plunger 550 and the concave recess 120. This prevents vertical movement of the collapsible container 108.

FIG. 5B depicts the disengagement of the locking ball 122 from the concave recess 120 such that the collapsible container 108 may be removed. First, a user depresses the plunger 550 as indicated by the arrow 552. Doing so aligns a ball-shaped pocket in the plunger 550 with the locking ball 122 and removes the lateral biasing force, which retains the locking ball 122 in a locked position within the concave recess 120. The locking ball 122 may still be biased towards the collapsible container 108. However, as a user raises the collapsible container 108 as indicated by the arrow 124, the locking ball 122 is positioned within the ball-shaped pocket on the plunger 550 and no longer blocks the vertical movement of the collapsible container 108. Thus, the collapsible container 108 may be disengaged from the truck-based attachment structure.

This process may be reversed to install the collapsible container 108 into the truck-based attachment structure. For example, a user may position the first side of the collapsible container 108 within the truck-based attachment structure with the flange 114 underneath the lip 116. The user may then press down on the plunger 550 to position the locking ball 122 within the ball-shaped pocket on the plunger 550. The user may then rotate the collapsible container 108 to a seated position within the truck-based attachment structure and release the plunger 550 such that the locking ball 122 sits between the concave recess 120 and the straight surface 548 of the plunger 550.

As depicted in FIGS. 5A and 5B, in an example, the attachment assembly may include an electrical contact 542. When seated in the respective truck-based attachment structure, this electrical contact 542 mates with an electrical contact 544 of the truck's electrical system. This connection provides power to an electrical outlet 240 installed in the collapsible container 108 to power certain electrical devices. While a particular example is provided of an electrical connection, other modalities may be used to establish an electrical connection between the collapsible container 108 and the truck's electrical system.

Thus, the present specification describes a system that selectively holds a collapsible container 108 in various locations within the truck based on the desired length of a flat loading/hauling surface. The system of the present specification also describes extra storage and electrical power for certain electrical devices.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5B, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A storage system, comprising:
  a collapsible container having a footprint sized to fit within a tailgate of a truck:
    in a collapsed state, the collapsible container is stowed in the tailgate with a lid of the collapsible container being flush with a bedside surface of the tailgate; and
    in a deployed state, the lid aligns with a raised ledge in a bed of the truck; and
  an attachment assembly, the attachment assembly mates with a tailgate attachment structure of the truck to secure the collapsible container to the tailgate when positioned thereon.

2. The storage system of claim 1, wherein upon disengagement of the attachment assembly from the tailgate attachment structure, the collapsible container is removable from the tailgate.

3. The storage system of claim 1, wherein the attachment assembly mates with a truck bed attachment structure of the truck to secure the collapsible container to the bed when positioned thereon.

4. The storage system of claim 1, wherein the collapsible container is maintained in the collapsed state via a latch structure of the tailgate.

5. The storage system of claim 1, further comprising a second collapsible container, wherein a second collapsible container attachment assembly mates with a second tailgate attachment structure to secure the second collapsible container to the tailgate when positioned thereon.

6. The storage system of claim 5, wherein the second collapsible container attachment assembly mates with a second truck bed attachment structure of the truck to secure the second collapsible container to the bed when positioned thereon.

7. The storage system of claim 1, further comprising a handle on the lid to facilitate raising the collapsible container from the collapsed state to the deployed state.

8. The storage system of claim 1, wherein:
  the attachment assembly comprises:
    a flange on a bottom edge of a first surface of the collapsible container, the flange interfaces with a lip of a truck-based attachment structure;
    a concave recess on a bottom edge of a second surface of the collapsible container opposite the first surface, the concave recess interfaces with a locking ball on the truck-based attachment structure; and
  depression of a plunger of the truck-based attachment structure and rotation of the collapsible container positions the locking ball within a ball-shaped pocket of the plunger so the collapsible container may be disengaged from the truck-based attachment structure.

9. The storage system of claim 1, further comprising an electrical outlet disposed within the collapsible container.

10. The storage system of claim 9, wherein the attachment assembly further comprises an electrical contact, the electrical contact mates with a truck electrical system contact when the attachment assembly is mated with a truck-based attachment structure.

* * * * *